United States Patent [19]

Kawai et al.

[11] Patent Number: 4,869,701
[45] Date of Patent: Sep. 26, 1989

[54] ELECTRICAL EDUCATIONAL TOY

[75] Inventors: Hiroyuki Kawai; Takeo Shibukawa; Fujiyo Mandai, all of Hamamatsu, Japan

[73] Assignee: Yamaha Corporation, Shizuoka, Japan

[21] Appl. No.: 126,817

[22] Filed: Dec. 22, 1987

[30] Foreign Application Priority Data

Dec. 25, 1986 [JP] Japan .................................. 61-313712

[51] Int. Cl.$^4$ ........................ A63H 33/04; A63H 3/16; A63H 3/12; G09B 19/00
[52] U.S. Cl. ......................................... 446/91; 446/99; 446/321; 273/156; 434/259; 434/308
[58] Field of Search .................... 446/91, 99, 100, 320, 446/297, 302, 321; 273/371, 156; 434/159, 259, 308

[56] References Cited

U.S. PATENT DOCUMENTS

| | | | |
|---|---|---|---|
| 1,211,590 | 1/1917 | Kennedy | 446/99 |
| 1,322,713 | 11/1919 | Marshall | 446/100 |
| 3,748,748 | 7/1973 | Bevan et al. | 273/156 X |
| 3,863,931 | 2/1975 | Forsyth et al. | 273/156 |
| 4,188,734 | 2/1980 | Rich | 434/159 |
| 4,480,833 | 11/1984 | Barcelow et al. | 273/85 B |

FOREIGN PATENT DOCUMENTS

| | | | |
|---|---|---|---|
| 0231142 | 8/1987 | European Pat. Off. | 446/297 |
| 2572300 | 5/1986 | France | 446/297 |
| 4602 | 6/1912 | United Kingdom | 446/99 |

Primary Examiner—Robert A. Hafer
Assistant Examiner—D. Neal Muir
Attorney, Agent, or Firm—Koda and Androlia

[57] ABSTRACT

A fabricated toy is equipped with a plurality of toy component members having predetermined shapes, a detecting device for detecting the assembly state of these toy component members, and a sound generating device for emitting sounds in accordance with the assembly state of the toy component members detected by the detecting device so that when the toy component members are correctly assembled, a specific shape is completed. In this fabricated toy, the sound generating device generates the sounds of mutually different kinds in the cases where the toy component members are correctly assembled and incorrectly. Infants, therefore, can play at the assembly of the toy for a long period of time, without losing their interest in the toy, and the toy, which is "a horse" or "a frog", can also serve as educational stuff for assembling correctly the toy into the shape of the animal.

8 Claims, 3 Drawing Sheets

ELECTRICAL EDUCATIONAL TOY

BACKGROUND OF THE INVENTION (a) Field of the invention:

The present invention relates to toys, and more particularly to fabricated toys utilized for play, education, etc. of infants.

(b) Description of the prior art:

It has been well known in the past that an assembling toy is combined in such a way that plural members are fitted to each other to assemble something with a predetermined shape.

In such a conventional assembling toy, however, there has been a problem that since individual members are merely combined, the toy has no sufficient fun and infants could quickly be tired of such a toy, though they begin to assemble the toy to play, with interest at first.

SUMMARY OF THE INVENTION

A primary object of the present invention is to provide a fabricated toy with which infants can play with interest for a long period of time.

Another object of the present invention is to provide a fabricated toy capable of determining whether or not the toy is correctly combined when assembled.

These objects are accomplished, according to the present invention, by being provided with a detecting device for detecting a combined state of plural members to be combined and a sound generating device for generating sounds in accordance with the combined state detected by the detecting device. In other words, when infants combine plural members of a toy with each other to thereby assemble something with a desired shape, the detecting device detects the combined state and the sound generating device generates musical sounds in accordance with the combined state detected by the detecting device, so that the infants can hear the sound in accordance with the state of the combined toy and can play with the toy for a long period of time, without losing their interest in the toy. Further, according to the fabricated toy, the toy can also be designed so that the sounds generated in the case where the toy has been assembled correctly (as directed in the instruction manual) are different from those in the case of incorrect assembly, with the result that it is possible for infants to assemble a plurality of members correctly (as directed in the instruction manual) and also an educational effect on the infants can be expected.

These and other objects as well as the features and advantages of the present invention will be apparent from the following detailed description of the preferred embodiments when taken in conjunction with the accompanying drawings.

DESCRIPTION OF THE PREFERRED EMBODIMENTS

Figure 1:
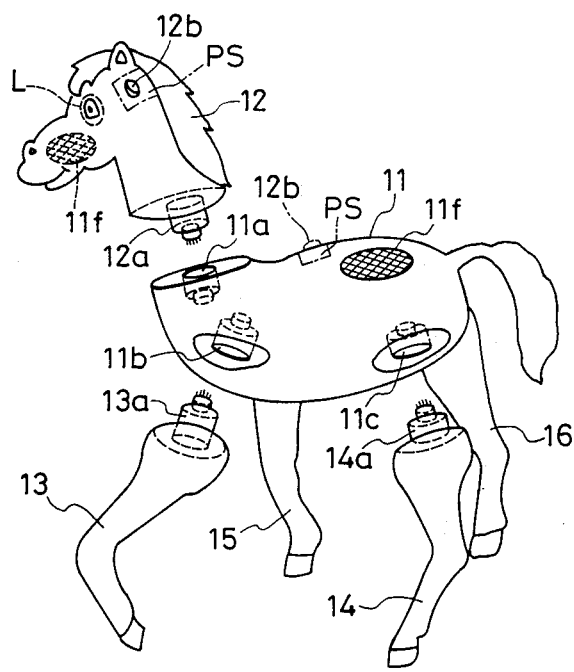
FIG. 1 is a general view of a fabricated toy having the shape of "a horse" according to one embodiment of the present inventin.

One embodiment of the present invention will hereunder be described by referring to the drawings. FIG. 1 shows schematically a general view of the fabricated toy having the shape of "a horse". This fabricated toy comprises a barrel member 11 corresponding to the barrel of "a horse", a head member 12 corresponding to the head of "a horse", and first through fourth leg members 13, 14, 15, 16 corresponding to four legs of "a horse", individual members 11, 12, 13, 14, 15, 16 of which are constructed of materials such as plastics and wood.

Figure 2:
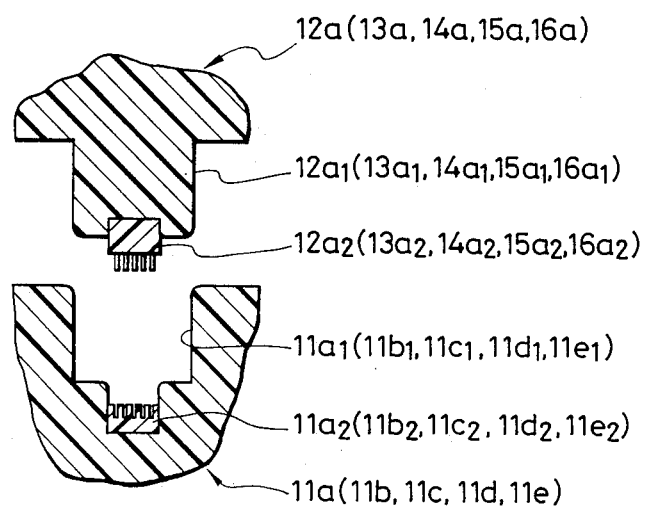
FIG. 2 is a view showing the detail of each fitting portion of FIG. 1.

The barrel member 11 possesses a fitting portion 11a for fitting the head member 12 thereto and fitting protions 11b, 11c, 11d, 11e (however, the fitting portions 11d, 11e of which are omitted in FIG. 1) for fitting the first through fourth leg members 13-16 thereto, respectively. The fitting portion 11a is provided with a column-shaped recess $11a_1$, as shown in FIG. 2, and an electrically connectable connector $11a_2$ is embedded in the bottom of the recess $11a_1$. The fitting portions 11b, 11c, 11d, 11e are also constructed individually in the same manner as in the fitting portion 11a and, as depicted in FIG. 2, have recesses $11b_1$, $11c_1$, $11d_1$, $11e_1$ and connectors $11b_2$, $11c_2$, $11d_2$, $11e_2$, respectively. Further, a speaker 11f is embedded in the barrel member 11 toward the outside.

The head member 12 has a fitting portion 12a for fitting the member 12 to the barrel member 11. The fitting portion 12a is provided with a column-shaped projection $12a_1$ fitted detachably into the recess $11a_1$ of the fitting portion 11a as shown in FIG. 2. In the upper surface of the projection $12a_1$ is embedded a male connector $12a_2$, which couples with the female connector $11a_2$ to allow an electrical connection to be performed. Also, on the outer surface of the head member 12 is disposed a manipulator 12b which is operated with depression control.

The first through fourth leg members 13-16 also have fitting portions 13a, 14a, 15a, 16a for fitting individual members 13-16 into the fitting portions 11b-11e of the barrel member 11, respectively. The fitting portions 13a, 14a, 15a, 16a are constructed individually in the same manner as in the fitting portion 12a of the head member 12 and, as illustrated in FIG. 2, posses; projections $13a_1$, $14a_1$, $15a_1$, $16a_1$ and male connectors $13a_2$, $14a_2$, $15a_2$, $16a_2$, respectively which couple with female connectors $11b_2$, $11c_2$, $11d_2$ and $11e_2$.

Figure 3:
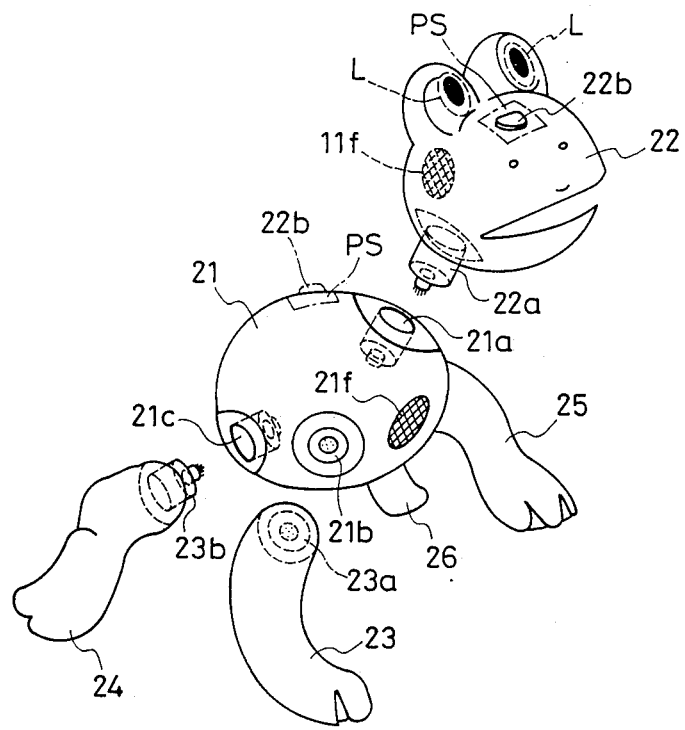
FIG. 3 is a general view of the fabricated toy having the shape of "a frog" according to another embodiment of the present invention.

FIG. 3 shows the fabricated toy having the shape of "a frog" instead of "a horse" mentioned above and this fabricated toy also has a barrel member 21, a head member 22 and first through fourth leg members 23-26. Since these members 21-26 are constructed in the same manner as in "a horse", the explanation is omitted by assigning reference numerals in twenties to respective members and portions of "a frog", corresponding to the case of "a horse". Also, in both the cases of "a horse" and "a frog", respective fitting portions are of the same shape and the same size and it is possible to fit freely respective members to each other.

Figure 4:
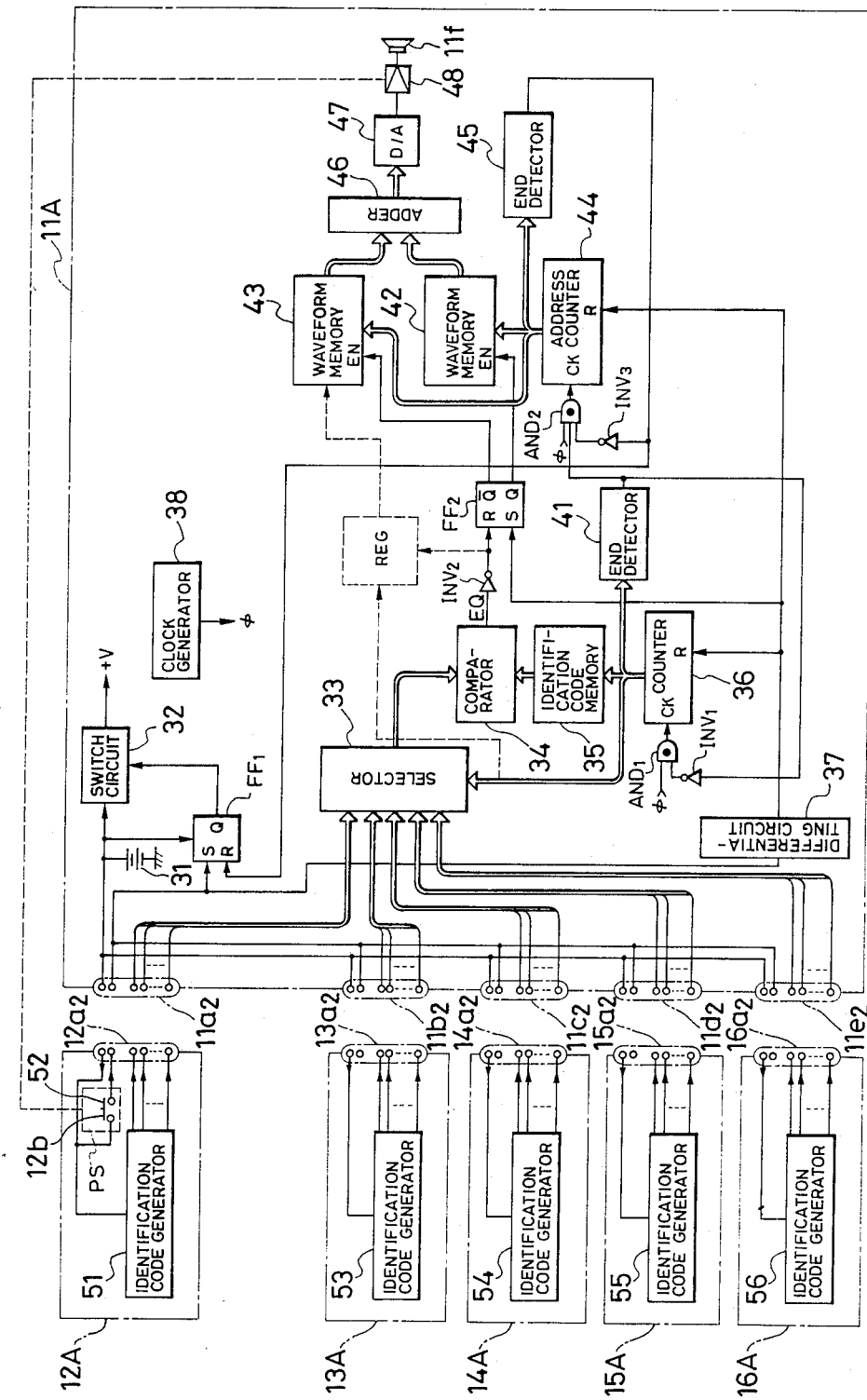
FIG. 4 is a view of electrical circuits incorporated in respective members shown in FIGS. 1 and 3.

Electrical circuits 11A, 12A, 13A, 14A, 15A, 16A shown in FIG. 4 are housed in the barrel member 11 (or 21), the head member 12 (or 22) and the first through fourth leg members 13-16 (or 23-26), respectively.

The electrical circuit 11A has a battery 31, which is connected to the first terminals (i.e. the topmost terminals shown in FIG. 4) of the connectors $11a_2$, $11b_2$, $11c_2$, $11d_2$, $11e_2$ to supply power voltage to the electrical circuits 12A, 13A, 14A, 15A, 16A and is adapted to supply the voltage through a switch circuit 32 to individual circuits within the electrical circuit 11A. The switch circuit 32 is designed to be controlled by a flip flop FF1 to which the voltage is always supplied from the battery 31. A set terminal S of the flip flop FF1 is connected in common with the second terminals (i.e. the second terminals from the top in FIG. 4) of the connectors $11a_2$, $11b_2$, $11c_2$, $11d_2$, $11e_2$ and when a signal level supplied to any of the second terminals turns high level "1" (which will be hereinafter referred only to as "1"), the flip flop FF1 is set to cause the switch circuit 32 to be in a conductive state. Further, when a signal supplied to a reset terminal R of the flip flop FF1 turns "1", the flip flop FF1 is reset so that the switch circuit 32 is set in a non-conductive state.

Also, the electrical circuit 11A has a selector 33 connected to each of groups of remaining terminals including the third terminals (i.e. the third terminals from the top and remaining terminals in FIG. 4) of the connectors $11a_2$, $11b_2$, $11c_2$, $11d_2$, $11e_2$ and the selector 33 outputs selectively identification codes, which will be mentioned later, supplied to the groups of the preceding terminals, to one input terminal of a comparator 34. An identification code memory 35 is connected to the other input terminal of the comparator 34, which outputs a coincidence signal EQ representative of "1" when both the input data entering from the selector 33 and the identification code memory 35 coincide with each other and representative of a low level "0" (which will be hereinafter referred only to "0") when they are antiocoincident. The identification code memory 35 stores respective identification codes representative of the head member 12 (or 22) and the first through fourth members 13-16 (or 23-26), in the order thereof, with respect to the barrel member 11 (or 21). To the selector 33 and the identification code memory 35 is connected a counter 36, which is reset by differential pulses differentiating the signals issued from the second terminals of the connectors $11a_2$, $11b_2$, $11c_2$, $11d_2$, $11e_2$ through a differentiating circuit 37 and, after this resetting, counts a signal $\phi$ supplied from a clock generator 38 through one input terminal of an AND circuit AND1. Further, the counter 36 controls the selector 33 so that the identification codes issued from the connectors $11a_2$, $11b_2$, $11c_2$, $11d_2$, $11e_2$ are selected in the order thereof for output and addresses respective storage so that the identification codes stored in the identification code memory 35 are read-out in the preceding order. Also, to the output terminal of the counter 36 is connected an end detector 41, which outputs a signal representative of "1" by detecting that the count value of the counter 36 has become '5'. This signal is inverted by an inverter circuit INV1 and is supplied to the other input terminal of the AND circuit AND1. Thereby, the counter 36, after reset by the differential pulse of the differentiating circuit 37, counts '1'-'5' and then ceases to count.

A flip flop FF2, connected to the comparator 34 through an inverter circuit INV2, is reset by the signal representative of "1" supplied to a reset terminal R thereof through the inverter circuit INV2 and is set by the differential pulse supplied to a set terminal S thereof from the differentiating circuit 37. Noninverting output Q and inverting output $\overline{Q}$ of the flip flop FF2 are connected to enabling terminals EN of waveform memories 42, 43, respectively. The waveform memory 42 is to store a series of sampling data representative of sounds, such as a cry of "a horse" (or "a frog"), fanfare, etc., generated when respective members 11-16 shown in FIG. 1 (or respective members 21-26 in FIG. 3) are in a correctly assembled state, and it can read-out the sampling data when the signal supplied to the enable terminal EN is representative of "1". The waveform memory 43, on the other hand, is to store a series of sampling data representative of sounds, such as a buzzer, a human voice suggesting an error, etc., generated when the assembly of the members is in an incorrect state, and it can read-out the sampling data when the signal supplied to the enable terminal EN is representative of "1". An address counter 44, connected to these waveform memories 42, 43, is reset by the differential pulse supplied from the differentiating circuit 37 and counts the clock signal $\phi$ supplied through the AND circuit AND2 to specify the address to be read-out of the memories 42, 43. To the output of the address counter 44 is connected an end detector 45, which outputs the signal representative of "1" by detecting that the count value reaches the final address values of the waveform memories 42, 43. This signal is supplied to the reset terminal R of the flip flop FF1 and after inverted by an inverter circuit INV3, is also supplied to the input terminal of the AND circuit AND2. The input terminal of the AND circuit AND2 is also connected to the output terminal of the end detector 41 and the AND circuit AND2 allows the clock signal $\phi$ to perform the step operation of the address counter 44 from the end detection executed by the end detector 41 to the end detection of the end detector 45.

The output terminals of the waveform memories 42, 43 are connected to an adder 46, which adds the sampling data entered from respective waveform memories 42, 43 to send it to a digital/analog converter 47. In such a case, it is impossible for both the waveform memories 42, 43 to output simultaneously the sampling data due to the control of the flip flop FF2, so that the adder 46 functions as an OR circuit. The digital/analog converter 47 converts the sampling data transmitted from the adder into an analog signal and outputs the signal to the speaker $11f$ through an amplifier 48. Then, the speaker $11f$ generates a sound corresponding to the analog signal.

The electrical circuit 12A is provided with an identification code generator 51 and a switch 52. The identification code generator 51 is connected between the first terminal (i.e. the topmost terminal in FIG. 4) and the terminals from the third to the last (i.e. the third terminal from the top and the subsequent terminals in FIG. 4) of the connector $12a_2$ and outputs the identification code representative of the head member 12 (or 22) to the third terminal and the subsequent terminals in virtue of the supply of a power voltage +V to the first terminal. Also, the switch 52 is connected between the first terminal and the second terminal (i.e. the second terminal from the top in FIG. 4) of the connector $12a_2$ and is normally open type switch which is not closed until the depression control of the manipulator $12b$ is performed, so that when the manipulator $12b$ is depressed, the power voltage +V supplied to the first terminal is outputted to the second terminal.

The electrical circuits 13A, 14A, 15A, 16A are provided with identification code generators 53, 54, 55, 56, respectively. The identification code generators 53, 54, 55, 56 are connected between the first terminals and the terminals from the third to the last of the connectors $13a_2$, $14a_2$, $15a_2$, $16a_2$, respectively, and output the identification codes representative of the first through fourth leg members to the third terminals and the subsequent terminals in virtue of the supply of the power voltage $+V$ to the first terminals.

Next, the operation of the embodiment constructed as mentioned above will be explained, together with its usage.

To begin with, all of the barrel members 11, 21, the head members 12, 22 and the first through fourth leg members 13–16, 23–26 are released from their fittings and are collected in disorder at a place, for example, in a box. In such a state, by fitting properly respective fitting portions $12a$–$16a$, $22a$–$26a$ of the head members 12, 22 and the first through fourth leg members 13–16, 23–26 to respective fitting portions $11a$–$11e$, $21a$–$21e$ of the barrel members 11, 21, infants combine the head members 12, 22 and the first through fourth leg members 13–16, 23–26 with the barrel members 11, 21 to assemble these members into "a horse" or "a frog".

When the infants depress the manipulator $12b$ (or $21b$) of the head member 12 (or 22) after assembling the members, the swtich 52 is closed. In this case, if the head member 12 (or 22) is enlarged with the barrel member 11 (or 21) at the predetermined position thereof, the power voltage $+V$ brought from the battery 31 is supplied, due to the connection between the connector $11a_2$ and the connector $12a_2$, to the set terminal S of the flip flop FF1 through the first terminals of the connectors $11a_2$, $12a_2$, the switch 52 and the second terminal of the connectors $11a_2$, $12a_2$. As a result, the flip flop FF1 is set to place the switch circuit 32 in a conductive state, so that the power voltage $+V$ is supplied to individual circuits within the electrical circuit 11A through the switch circuit 32 and thus the individual circuits begin to be actuated. Also, unless the head member 12 (or 22) is engaged with the barrel member 11 (or 21) at the predetermined position thereof, that is, even in case the connector $12a_2$ is connected to any of the connectors $11b_2$–$11e_2$, as the first and second terminals of the connectors $11b_2$–$11e_2$ are connected in common with the first and second terminals of the connector $11a_2$, the flip flop FF1 is set by the close of the switch 52 in the same manner as in the instance mentioned above and the circuits of the electrical circuit 11A begin to operate.

On the other hand, the power voltage $+V$ supplied to the set terminal S of the flip flop FF2 is also supplied to the differentiating circuit 37, which differentiate a signal changing from "0" to "1" in association with the supply of the voltage $+V$, thereby supplying the differential pulse to the reset terminal R of the counter 36, the set terminal S of the flip flop FF2 and the reset terminal R of the address counter 44. Accordingly, the counter 36 is reset, the flip flop FF2 is set and the address counter 44 is reset. After such setting and resetting, the end detector 41 outputs a signal representative of "0" in accordance with the fact that the count value of the counter 36 is '0' and a signal representative of "1" is transmitted to the other input terminal of the AND circuit AND1 through the inverter circuit INV1, so that the AND circuit AND1 supplies the clock signal $\phi$ issued from the clock generator 38 to the counter 36. By the supply of the clock signal $\phi$, the counter 36 begins to count from '1' to cause the count value to step in order. When the count value reaches '5', the end detector 41 outputs the signal representative of "1" and, through the inverter circuit INV1, the signal representative of "0" is supplied to the other input terminal of the AND circuit AND1, with the result that the counter 36 stops to step at '5'. The count value changing from '1' to '5' as mentioned above is supplied to the selector 33 and the identification code memory 35. As a result, the selector 33 selects in order the identification codes supplied to respective third terminals and the subsequent terminals of the connectors $11a_2$–$11e_2$ to transmit the selected code to the comparator 34. The identification code memory 35 outputs in order the identification codes representative of the head member 12 (or 22) and the first through fourth leg members 13–16 (or 23–26) with respect to the barrel member 11 (or 21).

Now provided that the head member 12 (or 22) and the first through fourth leg members 13–16 (or 23–26) are correctly attached to the barrel member 11 (or 21), the comparator 34 outputs continuously the coincidence signal EQ representative of "1" during the operation of the counter 36 counting from '1' to '5' as described above and thus the signal representative of "0" will be also continuously supplied to the reset terminal R of the flip flop FF2 through the inverter circuit INV2. Accordingly, the flip flop FF2 is maintained in the state set by the differentiating circuit 37, so that the noninverting output Q of the flip flop FF2 turns "1", the waveform memory 42 is placed in a readable state of the sampling data, and the waveform memory 43 is placed in a read inhibiting state of the sampling data. On the other hand, the address counter 44 is reset, at this time, by the differentiating circuit 37 as explained above and the count value of the counter 44 is maintained in the '0' state. As a result, since the signal representative of "1" is transmitted to the AND circuit AND2 through the inverter circuit INV3 and the preceding signal representative of "1" is supplied from the end detector 41, the AND circuit AND2 supplies the clock signal $\phi$ issued from the clock generator 38 to the address counter 44. By the supply of the clock signal $\phi$, the address counter 44 begins to count from '1' to cause the count value to step each '1'.

The step of the counter 44 allows the waveform memory 42 to output the sampling data stored in the memory 42 to the digital/analog converter 47 through the adder 46. The converter 47 converts the sampling data into an analog signal and transmits this signal to the speaker $11f$ through the amplifier 48. The speaker $11f$ generates a sound corresponding to the analog signal. In such a case, since the sampling data stored in the waveform memory 42 are representative of sounds such as a cry of "a horse" (or "a frog"), fanfare, etc., such sounds are generated from the speaker $11f$.

Further, when the count value of the address counter 44 becomes equivalent to the final address value of the waveform memory 42, that is, when the read-out of the sampling data from the memory 42 is completed, the end detector 45 outputs the signal representative of "1" and, through the inverter circuit INV3, the signal representative of "0" is supplied to the AND circuit AND2, with the result that the supply of the clock signal $\phi$ to the address counter 44 is stopped. Also, the signal representative of "1" issued from the end detector 45 is supplied to the reset terminal R of the flip flop FF1 to reset the flip flop FF1. By this reset, the swtich circuit 32 is set in a non-conductive state, so that the supply of the power voltage $+V$ from the battery 31 to individual circuits of the electrical circuit 11A is stopped and the operation of individual circuits is also stopped.

Further, if a part of the head member 12 (or 22) and the first through fourth leg members 13-16 (or 23-26) are incorrectly combined with the barrel member 11 (or 21) or unless a part of the first through fourth leg members 13-16 (or 23-26) is combined with the barrel member 11 (or 21), the comparator 34 outputs the coincidence signal EQ representative of "0" with any timing during the operation of the counter 36 counting from '1' to '5' and as such the signal representative of "1" will be supplied to the reset terminal R of the flip flop FF2, with the timing, through the inverter circuit INV2. Accordingly, before the end detector 41 outputs the signal representative of "1" (i.e. the count value of the counter 36 turns '5'), the inverting output $\overline{Q}$ of the flip flop FF2 turns "1", the waveform memory 43 is placed in the readable state of the sampling data, and the waveform memory 42 is placed in the read inhibiting state of the sampling data. As a result, the sampling data stored in the waveform memory 43 and representative of sounds such as a buzzer, a human voice suggesting an error, etc. are read out in the same manner as mentioned above and the speaker 11f generates the sound represented by the sampling data.

According to the above embodiments, as will be understood from the explanation described above, when infants operate the manipulator 12b (or 22b) after the assembly of "a horse" (or "a frog"), the sounds such as a cry of "a horse" (or "a frog"), fanfare, etc. is generated if its assembling state is correct, and the sound such as a buzzer, a human voice suggesting an error, etc. is generated if incorrect, with the result that the infants can play at the assembly of "a horse" (or "a frog") for a long period of time, without losing their interest in the toy and also there is an educational effect that enables the infants to correctly assemble "a horse" (or "a frog").

Further, the present invention constructed as described above can also be executed by the following modifications.

(1) The above embodiments, although adapted to assume the shapes of "a horse" and "a frog" as fabricated toys, may also be designed to imitate other shapes such as "an airplane", "a train" and "a car". Also, without imitating specific animals and vehicles as described above, the toys may well be intended to combine plural members in an abstract shape, for example, plural members of a cube or a rectangular parallelepiped colored in different tints, with each other. In such a case, it is desirable that a drawing showing an assembled state is prepared to render the infants assemble individual members in accordance with the drawing. Furthermore, without the abstract shape, the toys may also be designed to combine a plurality of plain members, such as figure-arrangement and letter-arrangement, with each other.

(2) The above embodiments, although adapted to output the sampling data representative of sounds by using the waveform memories 42, 43, may also be constructed to synthesize the sampling data or analog sound signals representative of sounds, for output, through a method such as calculation, vibration, etc. Further, although the above embodiments are adapted to output a series of sampling data for one from the waveform memories 42, 43, they may well be designed to output repeatedly a series of sampling data or analog sound signals, through the method according to the memories 42, 43 or the method according to the calculation and vibration in the preceding modification, so that the sound is repeatedly generated.

(3) The above embodiments, although adapted to control only the start of sound generation through the manipulators 12b, 22b and the switch 52 incorporated in the head members 12, 22, may also be constructed to provide the head members 12, 22 with pressure sensors PS as indicated in chain lines in FIGS. 1 and 3, instead of the manipulators 12b, 22b and the switch 52, and to control the type of loudness, timbre, frequency, etc. of the sound generated by the output of the pressure sensor as indicated in broken lines in FIG. 4 so that a sound is produced in accordance with force to strike the head members 12, 22. Furthermore, instead of providing the head members 12, 22 with the manipulator 12b, 22b or the pressure sensor PS, an arrangement may be made so that the manipulator 12b, 22b or the pressure sensor PS is attached to other member such as the barrel members 11, 21 as shown in FIGS. 1 and 3.

(4) The above embodiments, although adapted to generate always a kind of sound represented by the sampling data stored in the waveform memory 43 even if any member is combined by mistake with each other in the case where the toy of "a horse" or "a frog" is assembled in error, may also be designed to vary the kind of sound to be generated in accordance with the member combined by mistake. In such a case, it is desirable to be constructed so that the data for emitting several kinds of sounds are previously placed in the waveform memory 43 and, in such a manner as to store temporarily what member is combined by mistake in a register REG, as shown in broken lines in FIG. 4, based on the output (coincidence signal EQ) of the comparator 34 and to thereby distinguish the member, the preceding placed data are selected with respect to the sound generated in accordance with the result of the distinction. Moreover, the toy may be designed to emit the sound only when individual members are correctly combined with each other and not to generate the sound when the members incorrectly combined, for example, to turn on lamps or light emitting diodes L embedded in the eyes of the animals (see FIGS. 1 and 3).

(5) The above embodiments, although adapted to provide the barrel members 11, 21 with the devices such as the identification code memory 35 and the comparator 34 for distinguishing the assembled state and the devices such as the waveform memories 42, 43 and the speaker 11f for emitting the sound, may be constructed to provide other members such as the head members 12, 22 with these devices as indicated in broken lines in FIGS. 1 and 3. In addition, the toys may be intended to provide separately a box incorporating such devices as mentioned above and connect electrically the box with the barrel members 11, 21 to thereby use the box in common with "a horse" or "a frog".

What is claimed is:
1. A fabricated toy comprising:
plural toy component members having predetermined shapes capable of being mechanically coupled when said toy component members are assembled to construct a toy, said plural toy components being constructed so that a specific shape is completed when said plural toy component members are correctly assembled;
a plurality of electrical circuits, one of said plurality of electrical circuits being provided in each of said plural toy component members, said plurality of electrical circuits being electrically coupled together when said toy component members are assembled;

detecting means for detecting an assembled state of said plurality of electrical circuits when said plural toy component members are assembled; and sound generating means connected to said detecting means and constructed such that a sound generated in the case where in said plural toy component members are correctly combined with each other is different from that generated in the case where said plural toy component members are incorrectly combined.

2. A fabricated toy according to claim 1, further comprising manipulating means connected to said detecting means and capable of operating to actuate said detecting means.

3. A fabricated toy according to claim 2, wherein said detecting means and said sound generating means are incorporated in at least one of said plural toy component members and said manipulating means is provided on at least one surface of said plural toy component members.

4. A fabricated toy according to claim 1, wherein said plural toy component members vary in color.

5. A fabricated toy according to claim 2, wherein said manipulating means is a push button switch.

6. A fabricated toy according to claim 2, wherein said manipulating means is constructed as a pressure sensor capable of controlling the kind of sound to be generated from said sound generating means in accordance with force to strike said manipulating means.

7. A fabricated toy according to claim 1, further comprising means for distinguishing what member is combined in error when said plural toy component members are incorrectly assembled so that sounds different from each other are generated in accordance with the result distinguished by said distinguishing means.

8. A fabricated toy according to claim 1, further comprising light emitting means connected to said detecting means and provided to at least one of said plural toy component members so that a sound is generated by said sound generating means when said plural toy component members are correctly combined with each other, whereas said light emitting means is turned on when said members are incorrectly combined.

* * * * *

UNITED STATES PATENT AND TRADEMARK OFFICE
CERTIFICATE OF CORRECTION

PATENT NO. : 4,869,701

DATED : September 26, 1989

INVENTOR(S) : Hiroyuki Kawai, et al.

It is certified that error appears in the above-identified patent and that said Letters Patent is hereby corrected as shown below:

ON TITLE PAGE:

Column [21] Appl. No.: Change "126,817" to --136,817--

Signed and Sealed this

Seventh Day of July, 1992

Attest:

DOUGLAS B. COMER

*Attesting Officer*  *Acting Commissioner of Patents and Trademarks*